United States Patent
Hibi et al.

(10) Patent No.: US 7,146,256 B2
(45) Date of Patent: Dec. 5, 2006

(54) POWER SOURCE SWITCHING UNIT AND POWER SOURCE MANAGEMENT SYSTEM COMPRISING IT

(75) Inventors: Shinji Hibi, Osaka (JP); Masayoshi Tokiwa, Osaka (JP); Toshinobu Fujisawa, Osaka (JP); Tadatatsu Kanemoto, Osaka (JP); Yasunori Goda, Osaka (JP); Mamoru Fukae, Osaka (JP); Hiroshi Yoshimoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/504,449

(22) PCT Filed: Feb. 4, 2003

(86) PCT No.: PCT/JP03/01141

§ 371 (c)(1),
(2), (4) Date: Jan. 10, 2005

(87) PCT Pub. No.: WO03/069759

PCT Pub. Date: Aug. 21, 2003

(65) Prior Publication Data

US 2005/0128659 A1    Jun. 16, 2005

(30) Foreign Application Priority Data

Feb. 14, 2002 (JP) .............................. 2002-036682
Feb. 14, 2002 (JP) .............................. 2002-036729

(51) Int. Cl.
*G06K 15/00* (2006.01)
(52) U.S. Cl. .................. 700/286; 700/297; 218/69; 335/127
(58) Field of Classification Search .............. 700/286, 700/297; 218/69; 335/127
See application file for complete search history.

(56) References Cited

U.S. PATENT DOCUMENTS 5,555,182 A * 9/1996 Galm ........................ 702/69

(Continued)

FOREIGN PATENT DOCUMENTS

| JP | 58163239 A1 * | 3/1982 |
| JP | 06-038385 | 2/1994 |
| JP | 11-150871 | 6/1999 |
| JP | 11-225441 | 8/1999 |
| JP | 2001-268799 | 9/2001 |
| JP | 2002-252929 | 9/2002 |

OTHER PUBLICATIONS

"Power Utility Maximization for Multple-Supply Systems by a Load-matching Switch" -Park et al, ISLPED; Aug. 9-11, 2004, University of California, Irvine.*

*Primary Examiner*—Albert W. Paladini
*Assistant Examiner*—Michael D. Masinick
(74) *Attorney, Agent, or Firm*—Knobbe, Martens, Olson & Bear, LLP

(57) ABSTRACT

Each power source switching unit (8) of a electric power system (1) constituted of a power operating system having a power generator (3) driven by an external power source (40) and an engine (4) is constituted of a means for sensing information on a selected power source and supply power in time series, calculating a supply power quantity every power source on the basis of sense data, and storing these sensing and calculated data. This power source switching unit (8), disposed every power load group, comprises a means for communication with another power source switching unit (8). A power source management system, constituted of the power source switching unit (8), comprises a means for transmitting the sensed data or calculated data of each power source switching unit (8) to the control system of the power generating system, a means for receiving data transmitted from the power source management system, and an image display means for displaying the received data by graphing.

11 Claims, 16 Drawing Sheets

U.S. PATENT DOCUMENTS

| | | | |
|---|---|---|---|
| 6,487,096 B1 * | 11/2002 | Gilbreth et al. | 363/35 |
| 6,519,509 B1 * | 2/2003 | Nierlich et al. | 700/286 |
| 6,522,955 B1 * | 2/2003 | Colborn | 700/286 |
| 6,535,797 B1 * | 3/2003 | Bowles et al. | 700/286 |
| 2003/0075982 A1 * | 4/2003 | Seefeldt | 307/29 |

* cited by examiner

| time / electric energy | commercial electric energy (kWh) | generated electric energy (kWh) | load electric energy (kWh) |
|---|---|---|---|
| . | . | . | . |
| . | . | . | . |
| . | . | . | . |
| 13:00~14:00 | **** | **** | **** |
| 14:00~15:00 | **** | **** | **** |
| 15:00~16:00 | **** | **** | **** |
| 16:00~17:00 | **** | **** | **** |
| . | . | . | . |
| . | . | . | . |
| . | . | . | . |

Fig. 2

|  | commercial power | generated power | load power |
|---|---|---|---|
| power consumption (kWh/month) | **** | **** | **** |
| unit cost of power (¥/kWh) | **** | **** | **** |
| monthly charge (¥/month) | **** | **** | **** |

Fig. 3

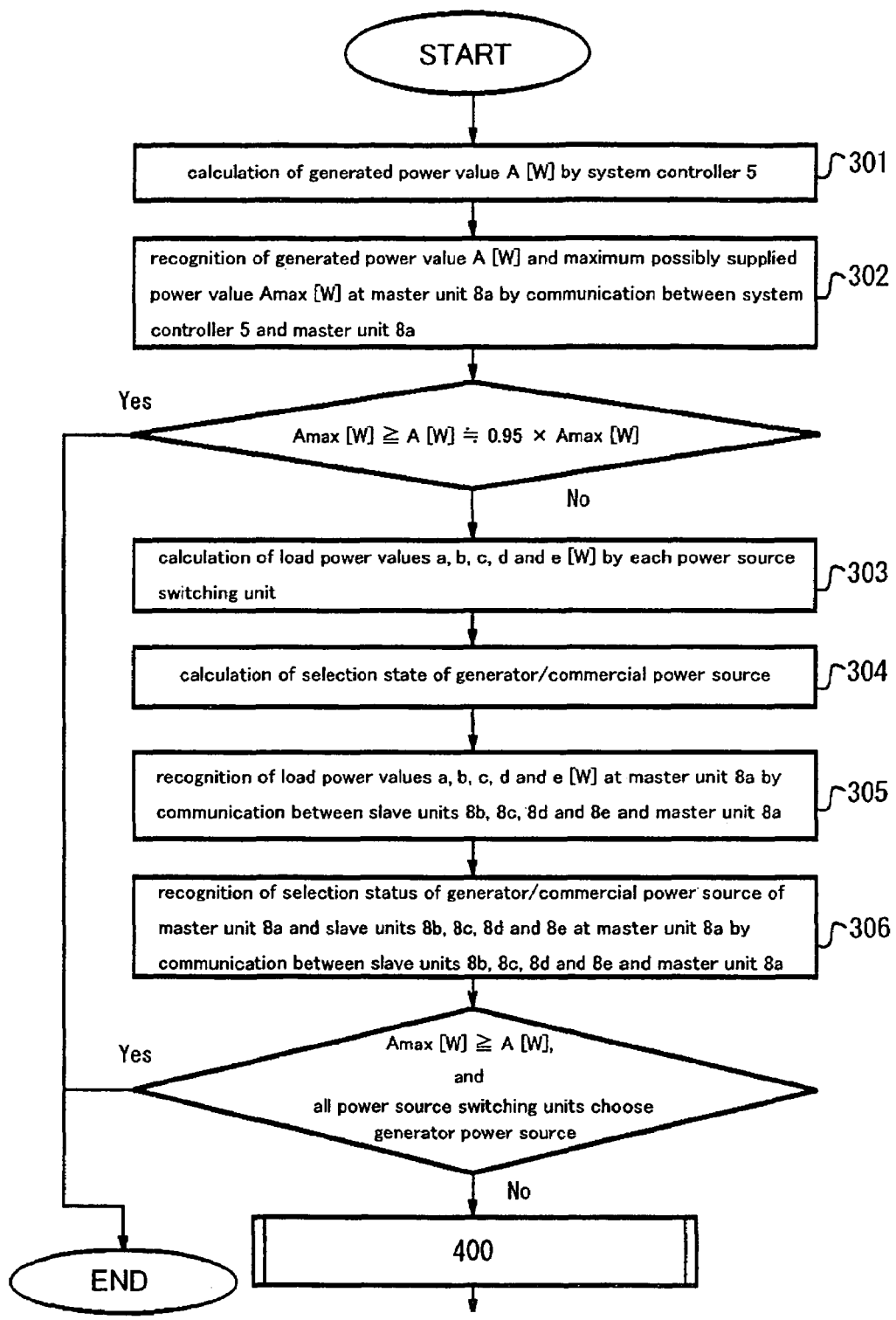
Fig. 10 (1)

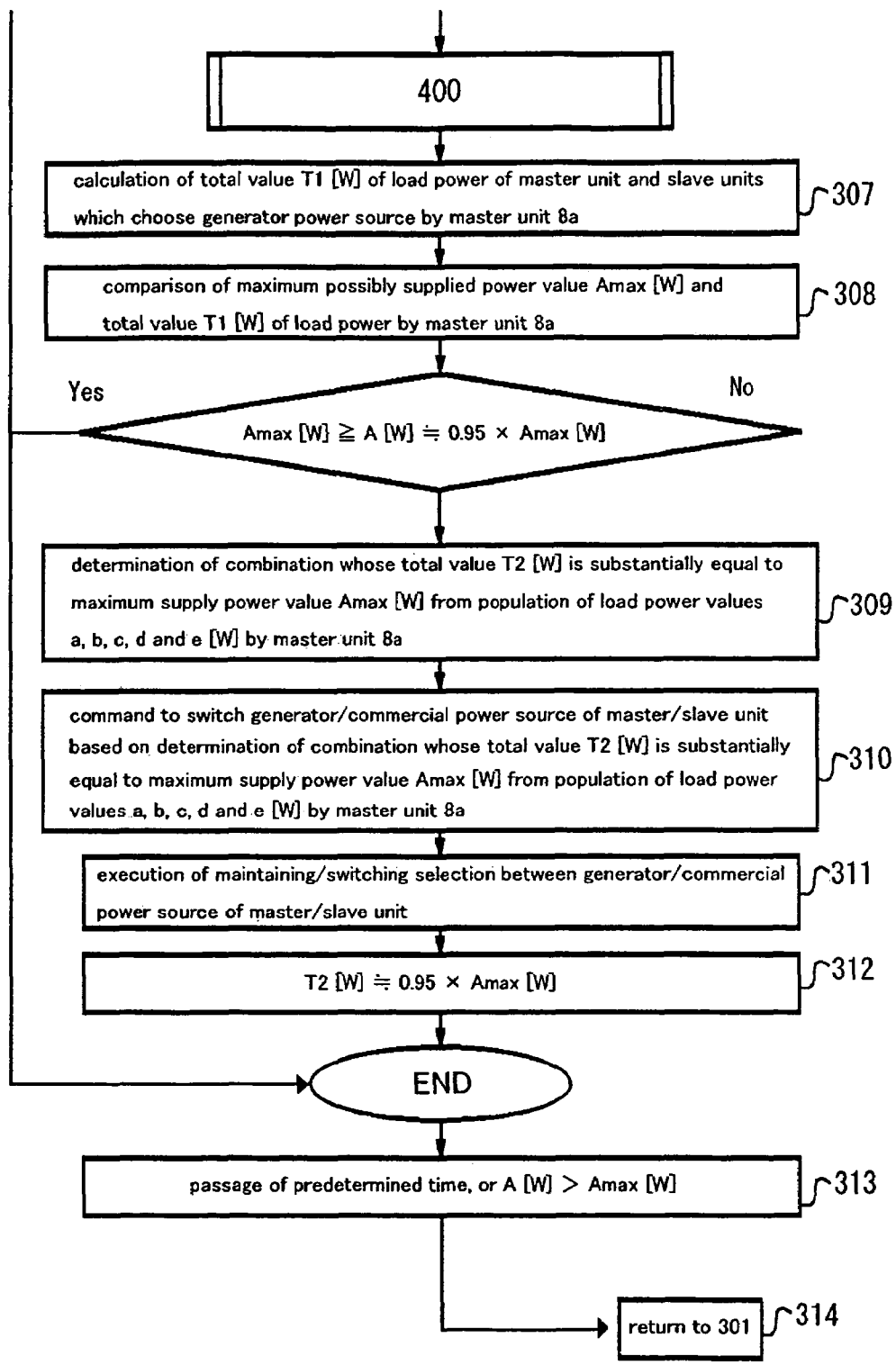
Fig. 10 (2)

US 7,146,256 B2

POWER SOURCE SWITCHING UNIT AND POWER SOURCE MANAGEMENT SYSTEM COMPRISING IT

This application is the U.S. National Phase under 35 U.S.C. §371 of International Application PCT/JP03/01141, filed on Feb. 4, 2003, which claims priority of Japanese Patent Application Nos. 2002-36682 and 2002-36729, both filed on Feb. 14, 2002. The International Application was published under PCT Article 21(2) in a language other than English.

TECHNICAL FIELD OF THE INVENTION

The present invention relates to a electric power system comprising a generator driven by an engine and power source switching units provided to respective power load groups, wherein each of the power source switching units controls its switching for alternatively selecting either the generator or the external power source as a power source supplying power to the corresponding power load group.

BACKGROUND ART

Conventionally, there is a well-known electric power system comprising: a power generation system having a generator driven by an engine; and a power source selector which is switched to alternatively select either an external power source or the generator as a power source supplied to each of power load groups.

The power source selector has power source switching units provided corresponding to the respective power load groups. Each of the switching units has means for detecting data concerning a value of electric power at its output side so as to detect data concerning a value of electric power to the power load group connected to the switching unit. A control mechanism in the power source selector calculates powers of all the power load groups by detecting data concerning the values of power to the respective power load groups, thereby controlling switching of the respective power source switching units.

Calculation of the used generated power share of all the power to loads in association with the above-mentioned control of the power source selector is effective for voltage control of the power generated by the generator so as to fully utilize the power of the generator. However, addition of such means as to detect power values to the respective power load groups for checking whether the generator or the external power source supplies power to each of the power load groups increases the whole electric power system in size and cost.

Further, each of the power source switching units provided corresponding to the respective power load groups requires networking with a controller for controlling generated power, switching for selection of power source, and setting of various parameters. In addition, the above-mentioned networking must ensure such mutual communication among the power source switching units as to make each of the power source switching units select the best power source. However, the wiring is complicated for the networking and communication among the plurality of power source switching units.

SUMMARY OF THE INVENTION

According to the present invention, a power source switching unit switched to select a power source is provided in an electric power system comprising an external power source and a power generation system having an engine and a generator driven by the engine. The power source switching unit comprises: means for periodically detecting information concerning the selected power source and supplied power; means for calculating electric energy supplied from each of the power sources based on the detected data; and means for storing the detected data and the calculated data. Accordingly, the power source switching unit can detect the power source selected by its switching, and detect current and voltage of power (load power) supplied from the selected power source.

The power source switching units are provided corresponding respective load power groups so as to constitute a power source management system for the electric power system comprising the external power source and the power generation system having the engine and the generator driven by the engine. Accordingly, each of the power source switching units can detect the power source selected by its switching, and detect current and voltage of power (load power) supplied from the selected power source. The electric power management system is constituted by the existing mechanism for controlling the electric power system, thereby saving costs and ensuring its compactness.

The power source management system further comprises means for transmitting the detected data or the calculated data of each of the power source switching units to a control system of the power generation system. Accordingly, check of the respective data (concerning electric power) and power management of the power generation system can be done at a place remote from the control system.

The control system of the power generation system comprises means for receiving the data transmitted from the power source management system, and image-displaying means for displaying the received data diagrammatically. Accordingly, each of the above-mentioned data can be collected by data storage means so as to enter the data into a device out of network with the power generation system. Especially, if the data are to be processed by a program different from the processing program stored in the control system or image-displaying means of the power generation system, the data-storage means can be used to enter the date into a computer storing the different processing program, thereby enabling various data processing for controlling power. Further, each of the above-mentioned data can be registered by data register means so as to enable a user at the place of the image-displaying means to check patterns of power supply and variation of electric energy. Especially, if a printer exists, the existing printer can mainly serve as means for checking the data and the diagrammatized data, so that, even if the image-displaying means comprises a possibly expensive liquid crystal display, the image-display means can be small-sized so as to save costs.

In the power source management system, each of the power source switching units comprises means for communicating with the other power source switching unit. Accordingly, each of the power source switching units commands drive control of the generator for rating its output, or for fully using its output depending on the switching of the power source switching units to select the generator power source. Furthermore, overload operation of the generators can be prevented.

In the power source management system, each of the power source switching units can serve as a master unit comprising: means for recognizing the selection of the power source and the supplied power to the corresponding power load group connected to the power source switching unit itself or each of the other power source switching units; and means for controlling a total value of power supplied of the electric power system to a level substantially equal to a rated value. Accordingly, almost all rated output of the generator is consumed by the power load groups, and the engine can drive with minimized fuel consumption per output.

In the power source management system, each of the power source switching units comprises means for controlling its switching for selecting the power sources based on information concerning a predetermined output value of the power generation system, thereby enabling optional setting including the setting for saving fuel or for prevention of overload driving of the engine, the setting of used rate of generated power, and the setting concerning selection of the power source.

BRIEF DESCRIPTION OF THE DRAWINGS

FIG. 2 is a comparative table listing hourly commercial electric energy and hourly generated electric energy.

FIG. 3 is a comparative table listing monthly commercial electric energy and charge and monthly commercial electric energy and charge.

FIG. 10 (1) and (2) illustrate a flow chart of switching control of the plurality of power source switching units by their networking.

BEST MODE FOR CARRYING OUT THE INVENTION

Figure 1:
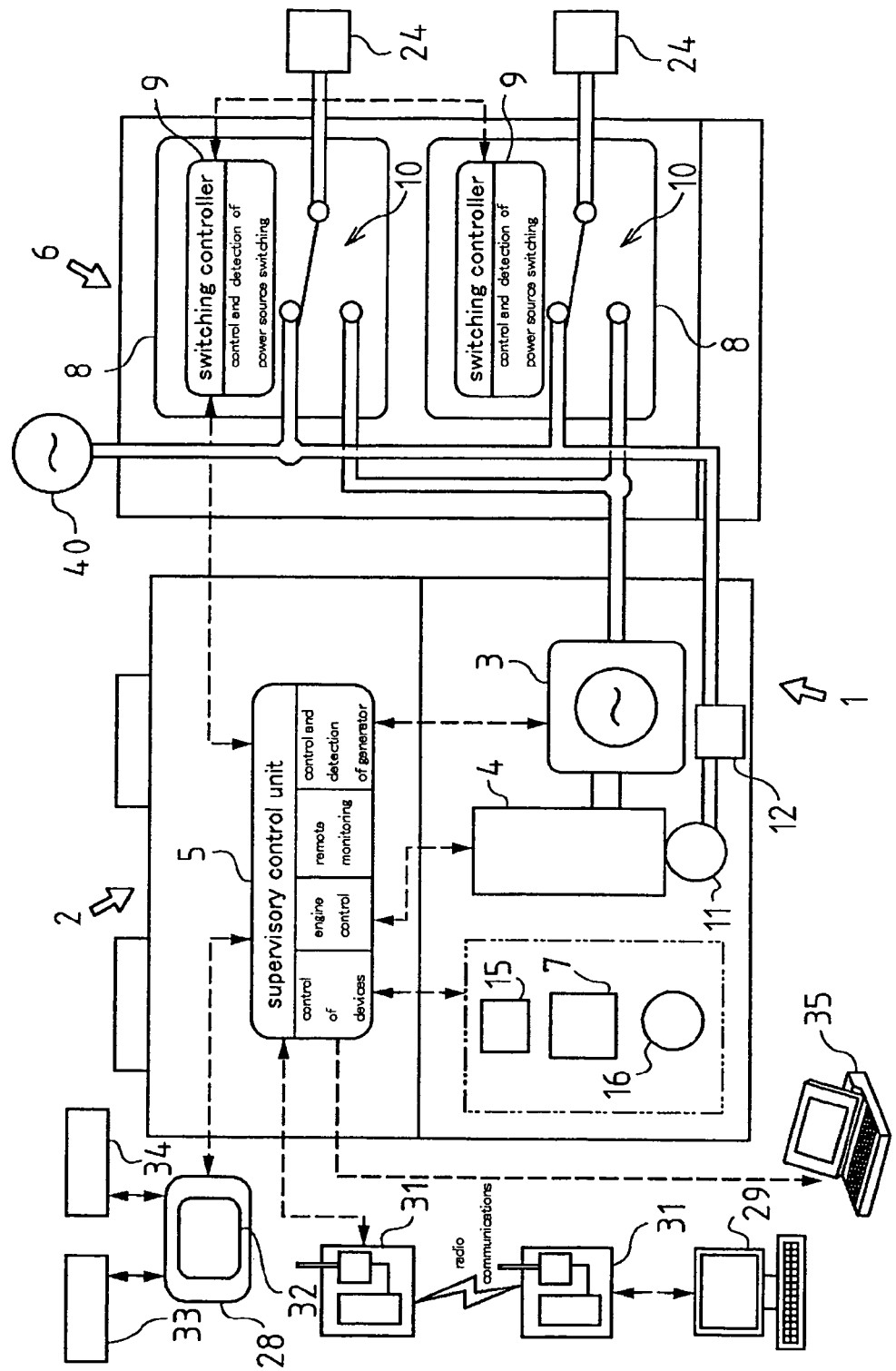
FIG. 1 is a schematic diagram of an electric power system.

A mode for carrying out the invention will be explained on the basis of attached drawings. The present invention is applicable to any electric power system if it comprises a generator driven by an engine and power source switching units provided corresponding to each of power load groups, and the electric power system controls switching of supply power source for each power load group between the generator and an external power source corresponding to fluctuation of each power load group. Application of the present invention is not limited to an electric power system 1 of the present embodiment. For example, the present invention may be applied to a cogeneration system using a drive source of a generator as a heat source.

Power generated by the power generation system may be externally supplied as commercial power as well as that of the external power source. However, in the present embodiment, the power generated by the electric power system is not regarded as commercial power to be externally supplied, and so the external power source is referred to as a commercial power source 40.

Hereafter, explanation will be given on an embodiment of the present invention according to FIG. 1.

The electric power system 1 comprises a power generation system 2 including a power generator 3, the commercial power source 40, and a power source selector 6 which switches power source between the power generation system 2 and the commercial power source 40. The commercial power source 40 is a form of the external power source against the power generator 3 (power generation system 2). The power generation system 2 has the generator driven by an engine 4. Namely, the electric power system 1 comprises the external power source (commercial power source 40) and the power generation system having the power generator 3 driven by the engine 4.

The power generation system 2 has the power generator 3 driven by the engine 4. A starter 11 is disposed in the engine 4 so as to be supplied with power via a transformer 12 from the commercial power source 40 serving as an example of the external power sources. Alternatively, the starter 11 may be supplied with power from a battery.

A ventilation fan 15 for cooling a chamber incorporating the engine 4 and a radiator 7, a cooling fan for cooling the radiator 7, and a cooling pump 16 delivering cooling water from the engine 4 to the radiator 7 are appendix power consumption devices disposed in the power generation system 2.

The electric power system 1 has a supervisory control unit 5 as a control system of the power generation system 2, centralized in control over the devices provided in the power generation system 2.

Namely, the supervisory control unit 5 controls the above-mentioned power consumption devices, the engine 4 and the power generator 3. In addition, the supervisory control unit 5 measures current value and voltage value of output of the power generator 3 by a detector (not shown) disposed in an output part of the power generator 3.

An operation-and-display unit 28 serving as input/output means of the control system is connected to the supervisory control unit 5 so that a user can transmit a control signal to the supervisory control unit 5 for controlling operation of the electric power system 1 by using the operation-and-display unit 28 and transmit information held (stored) in the electric power system 1 to the operation-and-display unit 28.

The electric power system 1 has power source switching units 8 provided in the power source selector 6 corresponding to each of power load groups 24. The power load groups presently means groups classified by the system type of power load, such as a driving system and an illumination system.

Each switching unit 8 is provided with a switch 10 and a switching controller 9 for switching the switch 10. The switching unit 8 can switch a power source for the respective power load groups 24 between the commercial power source 40 and the power generator 3 by switching operation of control of the switch 10. Namely, each of the power load groups 24 is not supplied with power from both the commercial power source 40 and the power generator 3, but from only one of them.

The electric power system 1 has the following management of power so as to fully utilize the possible power generated by the power generator 3.

When the power generator 3 generates power, respective values of load powers of all the power load groups 24 connected to the electric power system 1 are calculated for the best usage of the possible generated power. Namely, each of the switching units 8 decides whether it uses the power generator 3 as the power source or not, thereby changing the rate of generated power to the total load power.

Each of the switching units 8 can detect the following two data:

The first data detected by each switching unit 8 is a power source selection state, that is, the power source selected by the switch 10 for the corresponding power load group 24 whether it is the power generator or the external power source. More specifically, the switching position of the switch 10 is detected for the first data.

The second data detected by each switching unit 8 is data concerning the load electric power consumed by the corresponding power load group 24, which is detected by a detector (not shown) provided on the output side of the switch 10 (toward the power load group 24).

Each switching unit 8 and the corresponding power load group 24 are connected in series so that the load power to the power load group 24 is equal to the power supplied from the power source selected by the switching unit 8.

The switching controller 9 is provided with a memory as data-storage means for storing the above-mentioned first and second detected data.

Therefore, the switching unit 8 can detect and store data concerning the power source allotted to the corresponding power load group 24 connected thereto whether it is the power generator 3 or the commercial power source 40, and also detect and store data concerning the value (current and voltage) of power supplied from the power source.

The switching controller 9 can calculate the electric power and electric energy from the above-mentioned detected data, i.e., each current and voltage. Electric energy is obtained by time integration of the electric power, and is calculated at each predetermined period (in the present embodiment, hourly). The switching controller 9 is provided with a computer for the above-mentioned calculation.

Therefore, each switching controller 9 calculates the value of power supplied to the power load group 24 from the power supply through the corresponding switching unit 8 at each predetermined period.

Incidentally, it is possible that the switching unit 8 supplies electric powers from both the power generator 3 and the commercial power source 40 to the power load group 24 for the predetermined period because the switch 10 may switch the power source during the period.

The memory of each switching unit 8 stores the electric energy supplied from the power generator 3 to the power load group 24 through the switching unit 8 itself and the electric energy supplied from the commercial power source 40. Unless the switching unit 8 switches the power source while the predetermined period, the electric energy supplied to the corresponding power load group 24 from the power source isolated therefrom is zero.

Namely, each of the power source switching units 8 of the electric power system 1 has the following means: a first means (the above-mentioned detector provided at the output side of the switch 10) for periodically (every unit time) detecting information concerning the power source selection state and the value (current and voltage) of power supply; a second means (the switching controller 9) for calculating the electric energies from the respective power sources based on the detected data, and a third means (the above-mentioned memory of the switching unit 8) for storing the detected data and calculated data.

As the above mentioned, the switching unit as means for selecting a power source can detect the power source selected by its switching, and current and voltage of electric power (load power) from the detected power source.

Explanation will be given on a power source management system of the electric power system 1 according to FIG. 1.

The supervisory control unit 5 controls the power generation system 2 mainly comprising the power generator 3, and also controls each of the switching units 8 provided in the power source selector 6 directly or indirectly.

As shown in FIG. 1, the supervisory control unit 5 is connected to the respective devices provided in the power generation system 2 through communication lines so as to control them.

In the present embodiment, the switching units 8 in the power source selector 6 are networked with each other. One of the switching units 8 is set to a master unit, and the other switching units 8 are set to slave units. The switching unit 8 serving as the master unit is connected to the supervisory control unit 5. The supervisory control unit 5 controls the respective switching units 8 through the master switching unit 8.

Connection among the switching units 8 and connection between the switching units 8 and the supervisory control unit 5 are not limited to the above, and any connection style may be acceptable. For example, alternatively, each of the switching units 8 is networked not with another switching unit 8 but with the supervisory control unit 5 so that the supervisory control unit 5 controls each switching unit 8 directly.

The power source management system uses the above-mentioned control mechanism of the electric power system 1 mainly comprising the supervisory control unit 5.

The power source management system mainly comprises the power generator 3, the supervisory control unit 5 and the switching units 8 including the master unit and the slave units. The power source management system also comprises the engine 4 which changes output of the power generator 3 and the operation-and-display unit 28 which controls the electric power system 1 and receives data in the electric power system 1.

Data concerning the value (current and voltage) of power generated by the power generator 3 is transmitted from the power generator 3 to the supervisory control unit 5. As the above mentioned, the power generator 3 has the detector (not shown) for detecting the current and voltage.

The supervisory control unit 5 is provided with a memory as data-storage means, which stores the maximum value of possible power supplied by the power generator 3 as an initial value.

The supervisory control unit 5 transmits data concerning the detected value of generated power and the maximum value of possible power supplied by the power generator 3 to the master switching unit 8.

The master switching unit 8 processes the received data concerning the generated power value and the maximum possible power value so as to create the best control fully utilizing the power from the power generator 3.

In the above-mentioned construction of the power source selector 6, the master switching unit 8 controls each of the other switching units 8 by the network therebetween.

The master switching unit 8 receives data concerning load power value (current and voltage of load power) detected by each of the switching units 8 (including the master unit). Based on the transmitted data, the switching controller 9 of the master switching unit 8 calculates each of the load power value and totalize them so as to calculate the total load power value of all the power load group 24.

In addition, the switching controller 9 of the master unit deduces the optimal state of switching of each switching unit 8 based on the received data concerning generated power value and the above-mentioned maximum possible power value, and the total load power value which the switching controller itself has calculated. Namely, with respect to each of the switching units 8, the switching controller 9 of the master unit selects either of the power generator 3 and the commercial power source 40 as the supply power source for the corresponding power load group 24.

Accordingly, the power source management system performs the power management control with full utilization of the possible power of the power generator 3.

Each of the switching units 8 as the power source switching means uses its function for the above-mentioned two detections.

The first detection is detection of the switching state of the switch 10 so as to recognize the power source state, i.e., whether the power generator 3 or the commercial power source 40 is selected by the switching at each switching unit 8.

The second detection is detection of data concerning the value (current and voltage) of power (load power) supply from the selected power source by the detector (not shown) provided on the output side of the respective switch 10.

In this way, the power source management system comprises the power source switching means, i.e., the switching units 8 including the respective detection mean (the above-mentioned detectors) each of which detect its selected power source and the data concerning value (current and voltage) of power (load power) from the corresponding power source, and utilizes the detected data.

In addition, the power source management system itself is constructed by using the control mechanism of the electric power system 1 mainly concerned with the supervisory control unit 5.

According to such construction, it is not necessary to additionally provide expensive and space-requiring means for detecting data concerning the power values. Further, it is not necessary to provide new devices for constructing the power source management system. Therefore, cost for constructing the power source management system is reduced, and the whole device is miniaturized.

In the above-mentioned electric power management according to the present embodiment, the power source selector 6 is burdened with controlling each switching unit 8. Due to this construction, what required of the supervisory control unit 5 to be transmitted to the power source selector 6 (i.e., the master switching unit 8 thereof) are only the data concerning the value of power generated by the generator 3, a permission signal for switching into connection with the generator 3, and the maximum value of possible supplied power from the generator 3, etc.

Data transmitted from the power source selector 6 to the supervisory control unit 5 are the data calculated by the master switching unit 8, concerning the total of powers supplied from both the power sources, the total of load electric powers and energies, and the electric power and energy to each power load group 24.

Namely, the power source management system has means for transmitting the detected data and calculated data of each switching unit 8 to the supervisory control unit 5 serving as the system for controlling the electric power system 1. More specifically, the means for transmitting the data is a modem or the like disposed in the supervisory control unit 5. Accordingly, the operation-and-display unit 28 can display load state of each of the switching units 8. In addition, the data transmitted from the power source selector 6 to the supervisory control unit 5 are the results of calculative processing of the electric powers and energies. Therefore, traffic including the transmission between the supervisory control unit 5 and the power source selector 6 is reduced.

Even if the supervisory control unit 5 is made to individually control each of the switching units 8 instead of the construction of the present embodiment, the above-mentioned effects are achieved.

The operation-and-display unit 28 is input/output means, serving as both input means for transmitting control command to the supervisory control unit 5 and output means for receiving data transmitted from the supervisory control unit 5. Especially, the operation-and-display unit 28 is one of elements constituting the electric power system 1 and provided within the electric power system 1.

The supervisory control unit 5 is provided with an output terminal for data transmission, and as shown in FIG. 1, the operation-and-display unit 28 serving as the input/output means is networked with the supervisory control unit 5 through a wired communication line. The operation-and-display unit 28 may be a remote control board provided at a place distant from the supervisory control unit 5.

Due to the above-mentioned construction, the power generation system can have check of data concerning electric power and management of power at a place distant from the supervisory control unit 5.

A widely used personal computer 35 may serve as the operation-and-display unit 28.

For connecting the supervisory control unit 5 of the electric power system 1 to a supervisory operation-and-display unit 29 of a remote monitoring system of a maker, the electric power system 1 is provided with a communication adapter 31 for radio communication, and the remote monitoring system (central remote monitoring center) is also provided with a communication adapter 31. The communication adapters 31 enable two-way communication between the supervisory control unit 5 and the supervisory operation-and-display unit 29 remote from the electric power system 1.

On the contrary to the operation-and-display unit 28 provided within the electric power system 1, the supervisory operation-and-display unit 29 is an operation-and-display unit provided in the exterior of the electric power system 1.

The communication means between the supervisory control unit 5 and the supervisory operation-and-display unit 29 is not limited to radio communication, and wired communication using a communication line such as a telephone line may be used.

According to the above-mentioned construction, the data concerning electric power such as the above-mentioned detected data and calculated data stored in the supervisory control unit 5 can be transmitted to the operation-and-display units 28 and 29 through the supervisory control unit 5.

The operation-and-display unit 28 may be a remote supervisory panel disposed distant from the supervisory control unit 5, or replaced with the supervisory operation-and-display unit 29 of the remote monitoring system. Therefore, the electric power system 1 can have check of the above-mentioned data (concerning electric power) and management of power at a place distant from the supervisory control unit 5.

In the present embodiment, data is transmitted from the power source selector 6 having the switching units 8 to the operation-and-display units 28 and 29 through the supervisory control unit 5. However, the mode for carrying out the present invention is not limited to the embodiment. Alternatively, the power source selector 6 may be directly connected to the operation-and-display unit 28 without the supervisory control unit 5.

The supervisory control unit 5, which can transmit data to both the operation-and-display units 28 and 29 in the present embodiment, may alternatively have an ability of transmitting data to only one of them.

Explanation will be given on charts displayed on a display 32 provided in the operation-and-display unit 28 according to FIGS. 2 to 7.

Hereafter, the power supply system of the commercial power source 40 is referred to as a commercial electric power system component unit, and the power supply system of the power generator 3 is referred to as a generated electric power system component unit.

The construction discussed hereafter is also applicable to the supervisory operation-and-display unit 29.

The operation-and-display unit 28 serving as the input/output means has the display 32. The data are diagrammatized and displayed on the display 32 according to a processing program stored in the operation-and-display unit 28.

Firstly, a comparative table of FIG. 2 representing the commercial electric energies and the generated electric energies hour by hour will be described.

According to the above-mentioned processing program, the display 32 displays the table in which the above-mentioned calculated data, i.e., the commercial electric energies, the generated electric energies and the load electric energies are listed hour by hour. As mentioned above, in the present embodiment, each electric energy is calculated every hour, whereby the respective electric energies are lined up hour by hour.

According to the above-mentioned construction, a user of the electric power system 1 can feel a glow of satisfaction at the ability of recognizing electric energy generated by the power generator 3 and realizing the effect of his/her purchased electric power system 1.

Next, a comparative table of FIG. 3 representing monthly commercial and generated electric energies and charges will be described.

According to the above-mentioned processing program, the monthly commercial electric energy, the monthly generated electric energy and the monthly load electric energy are calculated by totaling the respective hourly electric energies, and the calculated monthly electric energies and corresponding monthly charges are displayed in a table on the display 32.

A unit cost of the commercial power per kWh (purchased power cost) shown in FIG. 3 has been informed by the commercial energy supplier (electric power company) and previously memorized in the operation-and-display unit 28. A unit cost of the generated power per kWh is calculated by the supervisory control unit 5 on the basis of the cost of fuel required for driving the engine 4, and corresponding to increase/decrease of fuel consumption.

The unit cost per kWh and charge of the generated energy means a running cost of the electric power system 1.

According to the above construction, a user can compare the commercial electric energy with the generated electric energy every month. Furthermore, the user can also compare the charge of the commercial power with that of the generated power. Therefore, the user can compare the running cost of the generated power with the cost for purchasing the commercial power so as to confirm running merit of the electric power system 1.

In the embodiment, the comparison is done every month, as shown in FIG. 3, however, the comparison may be done every day or every year.

The operation-and-display unit 28 calculates how long time is required for recovering cost of equipment investment of the electric power system 1 (initial cost) on the basis of the running merit of the electric power system 1 (the purchased power cost minus the running cost) so as to inform a user of it.

Figure 4:
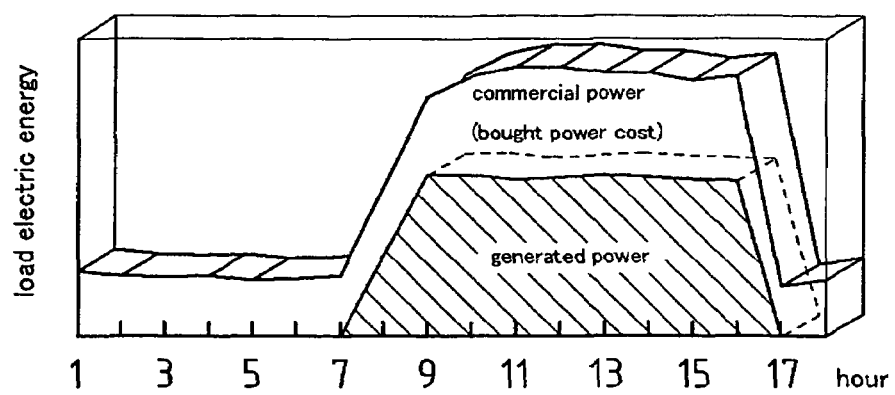
FIG. 4 is a comparative graph representing hourly commercial electric energy and hourly commercial energy.

A graph of FIG. 4 representing the hourly comparison of the commercial and generated electric energies will be described.

The graph of FIG. 4 is made by graphing the comparative table in FIG. 2. The axis of abscissas designates hour-by-hour passage of time, and the axis of ordinates designates variations of the respective electric energies.

Due to the above construction, a user can compare the electric energies supplied by the respective electric power system component units with each other every hour, so as to know in which hour the load electric power increases or decreases in a day, and to know what is the best electric power generating pattern for cost reduction corresponding to items of his/her contract with the electric power company. Therefore, the user can recognize the effect of his/her investment for equipment of the electric power generator set 1.

Figure 5:
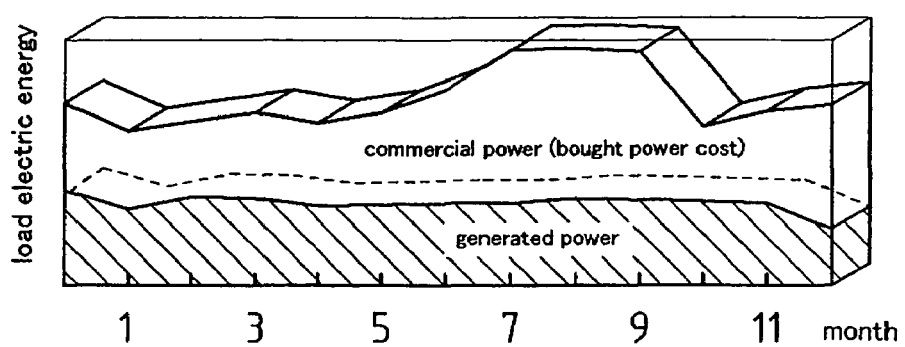
FIG. 5 is a comparative graph representing monthly commercial electric energy and monthly generated electric energy.

A graph of FIG. 5 representing monthly comparison of the commercial and generated electric energies will be described.

The graph of FIG. 5 represents the monthly comparison of the commercial and generated electric energies and variation of the load electric energy. The axis of abscissas designates month-by-month passage of time, and the axis of ordinates designates variation of the respective electric energies.

According to the above construction, a user can compare the electric energies supplied by the respective electric power system component units with each other every month, so as to know in which month the load electric power increases or decreases in a year, and to know what is the best electric power generating pattern for cost reduction corresponding to items of his/her contract with the electric power company. Therefore, The user can recognize the effect of his/her investment for equipment of the electric power generator set 1.

Figure 6:
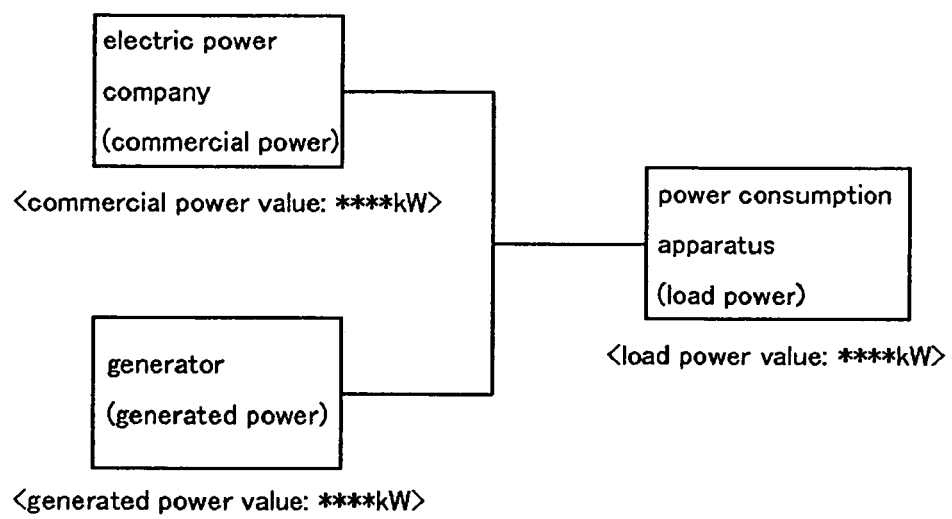
FIG. 6 is a conceptual diagram of the electric power system representing currently supplied electric powers of respective electric power system component units.

A conceptual diagram of the electric power system shown in FIG. 6 representing electric powers currently supplied by respective electric power system component units will be described.

According to the above-mentioned processing program, the display 32 displays the conceptual diagram of the electric power system, on which electric powers supplied by the respective electric power system component units can be displayed corresponding to the respective electric power system component units. The electric powers and fuel consumption displayed on the display 32 are the above-mentioned detected data and calculated data, and updated at each period of detection of the commercial current value, generated current value and generated electric power value by the inverter 6a. Namely, change of each electric power value is displayed on the display 32 in real time.

According to the above construction, a user can feel a glow of satisfaction at the ability of checking momentarily change of the electric powers supplied by the respective electric power system component units, and at the ability of easily grasping variation of the supplied electric powers in image because the supplied electric powers are displayed corresponding to the conceptual diagram.

Figure 7:
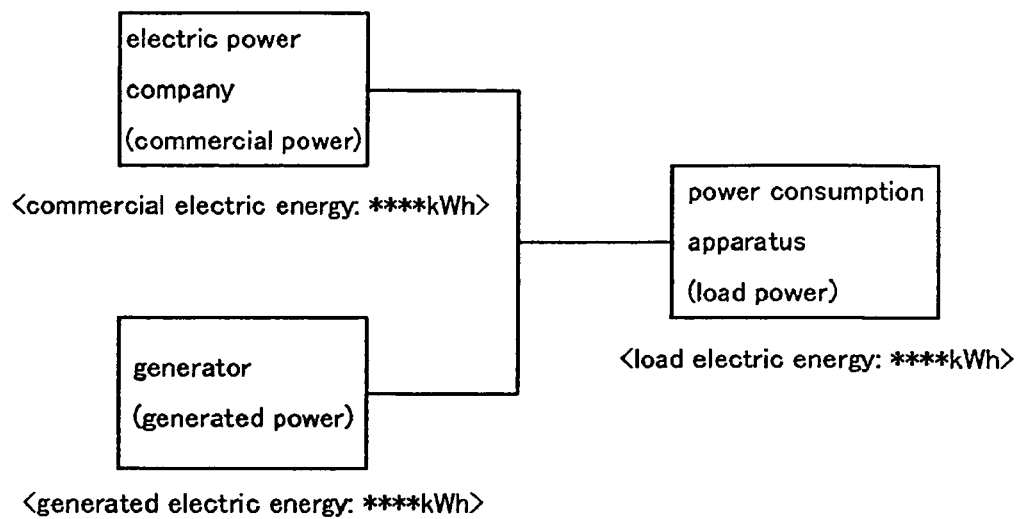
FIG. 7 is a conceptual drawing of the electric power system representing monthly supplied electric powers of respective electric power system component units.

A conceptual diagram of the electric power system shown in FIG. 7 representing electric energies monthly supplied by the respective electric power system component units will be described.

According to the above-mentioned processing program, the display 32 displays the conceptual diagram of the electric power system component units, on which the monthly electric energies supplied by the respective electric power system component units and the monthly fuel consumption can be displayed corresponding to the respective electric power system component units. Each of the monthly electric energies is the monthly total of the calculated data of the corresponding hourly electric energies, similarly to the comparative table of FIG. 3 representing the monthly electric energies and charges of the respective commercial and generated electric powers.

Due to the above construction, a user can feel a glow of satisfaction at the ability of checking the monthly electric energies supplied by the respective electric power system component units, and at the ability of easily grasping comparison of the monthly electric energies in image because the supplied electric energies are displayed corresponding to the conceptual diagram.

The period of the comparison is not limited to each month, and it may be each day or each year.

The operation-and-display unit 28 serving as the input/output means of the control unit 5 can be used as output means for taking out each of the above-mentioned data from the electric power generator set 1.

In this regard, the operation-and-display unit 28 has a mechanism for outputting to an IC card (card-like device) 33 serving as data-storage means, and a mechanism for outputting to a printer 34 serving as data-recording means. Therefore, each of the above-mentioned data can be memorized in the IC card 33, and numerical information of each of the above-mentioned data and the above-mentioned diagrams (such as FIGS. 2 to 7) can be printed by the printer 34.

Due to the above construction, each of the above-mentioned data can be collected by the IC card 33 so as to be read by a device which is not networked with the electric power generator set 1. Especially if a computer reads the data from the IC card 33 and the computer stores a data processing program different from those stored in the control unit 5 and operation-and-display unit 28, the data processing can enhance variation of electric power management.

The printer 34 can print the numerical information of each of the above-mentioned data and the above-mentioned diagrams. Namely, due to each of the above-mentioned data recorded by the data-recording means, the user can check change of supplied electric power and energy at the place of the operation-and-display unit 28. Especially in the case of providing the printer 34, the printer 34 can serve as main means for checking the data and diagrams thereof, whereby a small liquid crystal display, for example, can be used as the display 32 so as to reduce costs thereof.

Next, explanation will be given on a second embodiment of the present invention. Firstly, a construction of an electric power system 1 of the present embodiment will be described according to FIG. 8.

The electric power system 1 comprises: a power generation system including a commercial power source 40; a power generation system including a power generation system 2 and a power source selector 6; and the power source selector 6.

The power generation system 2 has a power generator 3 driven by an engine 4. A starter 11 is disposed in the engine 4 so as to be supplied with power from the commercial power source 40 through a transformer 12. Alternatively, the starter 11 may be supplied with power from a battery.

The power generation system 2 comprises appendix power consumption devices such as a ventilation fan 15 for cooling a chamber incorporating the engine 4 and a radiator 7, a cooling fan 7a for cooling the radiator 7, and a cooling pump 16 delivering cooling water from the engine 4 to the radiator 7.

The engine 4 is disposed in a machinery room (not shown). Liquid fuel, such as light oil, kerosene or heavy oil, or gaseous fuel, such as natural gas, town gas or sewage digestion gas, can be used as fuel for the engine 4, and the fuel is supplied to the engine 4 from an external fuel tank or an infrastructure (not shown) through a fuel supply piping 49. A fuel flowmeter 50 is disposed in the fuel supply piping 49 and detects data concerning fuel consumption of the engine 4 so as to transmit the data to the supervisory control system 5. The data are taken into account with a unit cost of fuel so as to compute a unit cost of generated electric power in each time zone and an average unit cost of the generated electric power in a predetermined period. With regard to the present embodiment, detection of flux is used as a method for detecting fuel consumption. However, the method is not limited thereto. Detection of change of weight of a tank at the time of supplying fuel to the tank or the like also is considerable as the method.

The electric power system 1 is provided with a supervisory control unit 5, serving as a control system of controlling the power generation system 2, i.e., for centralized control over each of devices provided in the power generation system 2.

Namely, the supervisory control unit 5 controls operation of the above-mentioned power consumption devices, the engine 4 and the power generator 3. In addition, the supervisory control unit 5 has a detector (not shown) on an output part of the power generator 3 so as to calculate a generated current A [W] of the power generator 3.

An operation-and-display unit 28 is connected to the supervisory control unit 5. A user can operate the operation-and-display unit 28 so as to transmit control parameters to the supervisory control unit 5 for establishing any of various operation patterns (to be discussed later) of the electric power system 1. Also, the operation-and-display unit 28 receives information calculated and held (stored) by the electric power system 1.

A plurality of power source switching units 8a, 8b, . . . are provided in the power source selector 6 corresponding to respective power load groups 24. Of course, a single source switching unit 8 may be provided corresponding to only one power load group 24. Namely, the power source selector 6 has one or more power source switching units 8a, 8b, . . . .

Each of the power source switching units 8a, 8b, . . . is provided with a switch 10 and a switching controller 9 for switching the switch 10. The switching controller 9 has abilities of processing and registering various data and cooperating with the other switching controllers 9.

The switching controller 9 switches the corresponding switch 10 so as to select a power source for the corresponding power load group 24 between the power generator 3 driven by the engine (hereafter, referred to as "generator power source") and the commercial power source 40. Namely, both the generator power source and the commercial power source 40 do not simultaneously supply power to one power load group 24, but one of the power sources is alternately selected to supply power. Each of the switching controllers 9a, 9b, . . . can detect or calculate the following two data.

One of the two data is data concerning a power source selection state, i.e., which power source is selected for the corresponding power load group 24 between the generator power source and the commercial power source 40. The detection of the first data depends on detection of the switching position of the switch 10.

The other data is data concerning load power for calculation of power supplied to the corresponding power load group 24. The data is detected by a detector (not shown) provided on the output side of each switch 10 (toward the power load group 24).

Each of the switching controllers 9a, 9b, . . . is provided with a memory as data-storage means for storing the detected data and calculated data.

Furthermore, the memory of each of the switching controllers 9a, 9b, . . . stores timings of switching the switch 10, that is, a history of the dates and times when the power source was shifted between the generator power source and the commercial power source 40.

Accordingly, with respect to each of the generator power source and the commercial power source, each of the switching controllers 9a, 9b, . . . multiplies the power supplied to the corresponding power load group 24 by the accumulated time of the history so as to calculate each of powers supplied by the respective power sources. Namely, each of the power source switching units 8a, 8b, . . . (i.e., each of the switching controllers 9a, 9b, . . . therein) has a function of calculating the power supplied from the generator power source, calculating the power from the commercial power source 40, and storing the history of shift timings of the power source.

Each of the power source switching units 8a, 8b, . . . can be networked with each other and with the supervisory control unit 5 so that the supervisory control unit 5 and the power source switching units 8a, 8b, . . . control shift of selected power source in cooperation.

Namely, each of the power source switching units has means for communication with the other power source switching units. Specifically, the communication means comprises a modem disposed in the switching controller of each of the power source switching units.

Hereafter, explanation will be given on the cooperation.

Each of the switching controllers 9a, 9b, . . . disposed in the respective power source switching units 8a, 8b, . . . can be networked with the supervisory control unit 5 and the other switching controllers 9a, 9b, . . . . One of the switching controllers 9a, 9b, . . . is optionally selected as a master unit such as to accumulate the above-mentioned data detected and calculated by itself and the other switching controllers 9a, 9b, . . . , that is, the data concerning the selection of power source and the value of supplied power, and collectively process them.

Each of the switching controllers 9a, 9b, . . . has the function as the master unit so as to float the role as the master unit every predetermined time. This construction is convenient when the master unit requires maintenance because the power generation system can remain operating by shifting the function as the master unit to the other switching controller. The construction also facilitates for easy extending and exchanging of the power source switching units.

Any communication style can be employed. With regard to line system of wire communication, for example, by adopting multidrop method, a wiring 18 among the supervisory control unit 5 and the power source switching units 8a, 8b, . . . is simplified. Such easy connection facilitates for flexibly increasing the power source switching units 8 (expanding the power source selector 6) corresponding to the increase of the power load groups in the future. By adopting radio communication, labor of wiring and connection can be omitted, and extension of devices can be done easily.

The power source switching unit 8a serving as the master unit commands the other power source switching units 8b, 8c, . . . to switch for selection of the power source. Each of the power source switching units can be switched for selection of the power source by command by the command of the master unit 8a or by self-judgment without the command of the master unit.

In this way, each of the power source switching units has two types of selection of the power source: one is selection by the command of the master power source switching unit 8a based on its centralized processing; the other is selection by self-judgment.

Figure 9:
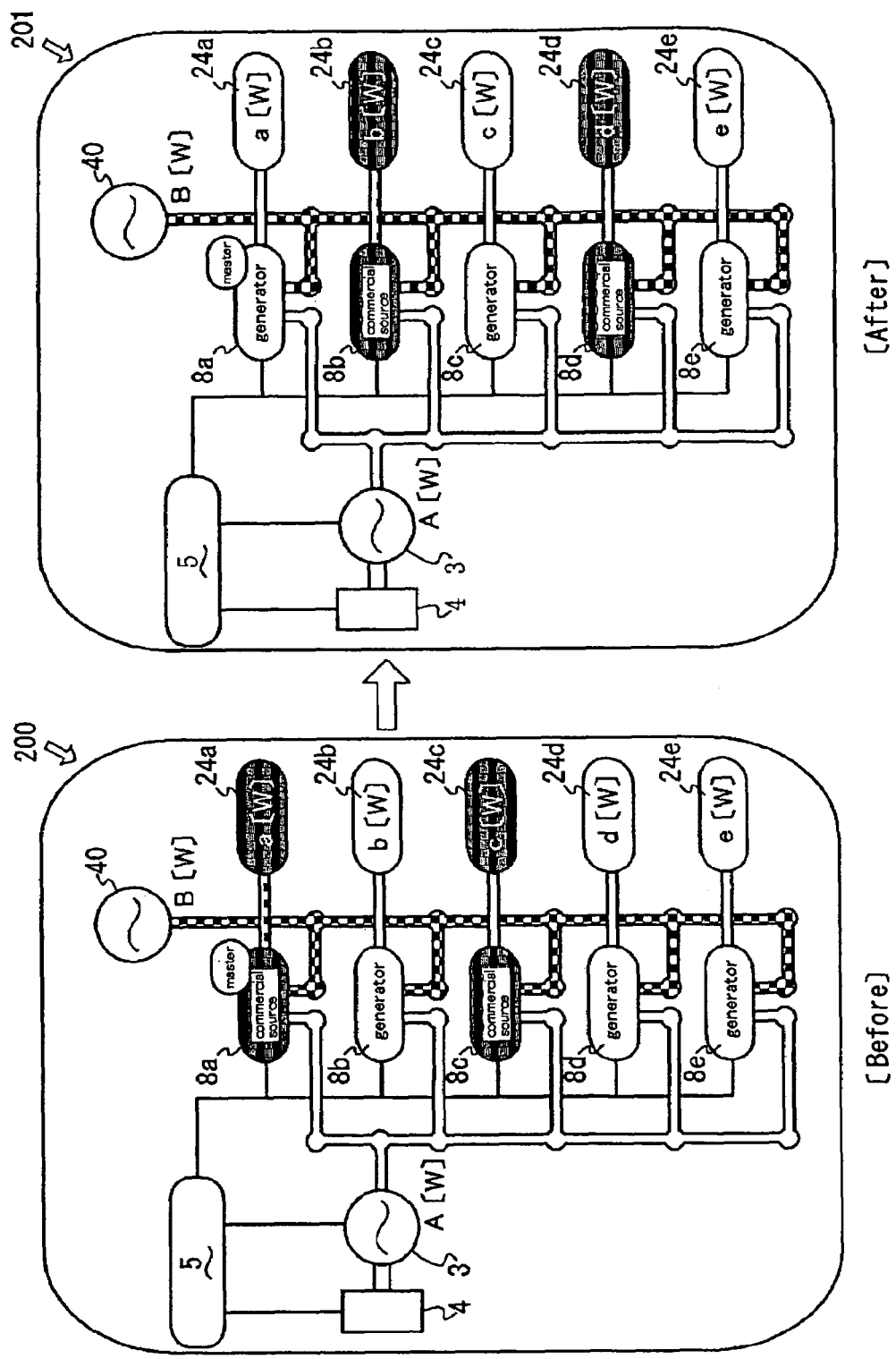
FIG. 9 is a diagram of power source switching units each of which selects either generator power source or commercial power source.

As shown in FIG. 9, the plurality of the power source switching units 8a, 8b, 8c, 8d and 8e are so switched as to be classified into a group of the power source switching units 8b, 8d and 8e selecting the generator power source and a group of the power source switching units 8a and 8c selecting the commercial power source 40. Therefore, as discussed later, the respective generators can be controlled to drive at a rated speed by the command of the power source switching unit, or to drive fully by the power source selected by the corresponding power source switching unit. Furthermore, the generators for distributed power supplies can be prevented from overload operation.

The switching control flows by the command of the master unit and by self-judgment are discussed later.

[1: Control of Power Source Selector]

Explanation will now be given on control by the power source selector 6 of the electric power system 1 with the above-mentioned construction. In the present embodiment, the power source selector 6 comprises the power source switching units 8a, 8b, 8c, 8d and 8e.

As shown in FIG. 9, under the control over the power source switching units 8a, 8b, 8c, 8d and 8e, each of the power source switching units 8a, 8b, 8c, 8d and 8e is switched to select its power source between the generator and commercial power sources. In FIG. 9, each of reference numerals 200 and 201 designates a power source selection state representing which power source each of the power source switching units 8a, 8b, 8c, 8d and 8e selects, wherein the reference numeral 200 designates the state before switching, and the reference numeral 201 designates the state after switching. The switching control patterns will be described one after another.

[1-1: Switching Control by Cooperation of Power Source Switching Units]

In this control, one of the power source switching units is optionally selected as a master unit. The master unit recognizes the power source selection state and the value of power supply to the corresponding power load group 24 with respect to itself and each of the other power source switching units. The master unit decides keeping or shifting of the power source selection sate of itself, and of each of the other power source switching units, considering that the total of power supplies from the respective power source switching units selecting the generator driven by the engine as the power source becomes substantially equal to the rated output of the generator power source.

This control is represented by a flow chart 300 of FIG. 10 (1) and (2). Hereafter, explanation will be given of the flow chart 300.

The supervisory control unit 5 calculates generated power A [W] from its current and voltage detected by the detector (not shown) disposed in the output part of the power generator 3 (a step 301).

The supervisory control unit 5 transmits the data of the calculated generated power A [W] to the power source switching unit of the master unit (hereafter, referred to as "master unit 8*a*" (shown in FIG. 9)) so that the master unit 8*a* recognizes the generated power A [W] and the maximum possibly supplied power Amax [W] (a step 302). The maximum possibly supplied power Amax [W] is the upper limit of the generated power value A [W] (maximum output 72 in FIG. 14), which can be arbitrarily established at later-discussed parameter setting.

The master unit 8*a* compares the generated power A [W] with the maximum possibly supplied power Amax [W].

If the generated power A [W] is not larger than the maximum possibly supplied power Amax [W] but substantially equal thereto at this stage, the control is completed. On the other hand, if the generated power A [W] is not substantially equal to the maximum possibly supplied power Amax [W] of the power generator 3, the master unit 8*a* or each of the power source switching units 8*b*, 8*c*, 8*d* and 8*e* selects either the power generator 3 or the commercial power source 40 so as to increase the generated power A [W] to the level substantially equal to the maximum possibly supplied power Amax [W]. From the viewpoint of efficiency in operation of the electric power system 1, the generated power being substantially equal to the maximum possibly supplied power Amax [W] is preferably up to about 95% of the maximum possibly supplied power Amax [W].

The value of the generated power regarded as being substantially equal to the maximum possibly supplied power Amax may be an invariable or established by inputting data into the supervisory control unit 5 or the power source selector 6.

The power source switching units 8*a*, 8*b*, 8*c*, 8*d* and 8*e* calculate respective load powers a, b, c, d and e [W] (shown in FIG. 9) required for the corresponding power load groups 24*a*, 24*b*, 24*c*, 24*d* and 24*e* (a step 303).

Each of the power source switching units 8*a*, 8*b*, 8*c*, 8*d* and 8*e* calculates its generator/commercial power source selection state (a step 304).

The master unit 8*a* communicates with the other power source switching units 8*b*, 8*c*, 8*d* and 8*e* (hereafter, referred to as "slave units 8*b*, 8*c*, 8*d* and 8*e*" (shown in FIG. 9)) so as to recognize the load powers a, b, c, d and e [W] (a step 305).

The master unit 8*a* recognizes the generator/commercial power source selection states of the respective slave units 8*b*, 8*c*, 8*d* and 8*e* (a step 306).

If the generated power A [W] is smaller than the maximum possibly supplied power Amax [W] and all the power source switching units select the power generator as the power source at this step, the present control is completed.

Next, the later-discussed self-judgment control step is performed (control shown by a numeric 400). The power source selector 6 may omit this later-discussed control step.

Next, the master unit 8*a* checks the units selecting the generator power supply (at the state before execution of the switching control shown in FIG. 9, they are the slave units 8*b*, 8*d* and 8*e*) among the master unit 8*a* and the slave units 8*b*, 8*c*, 8*d* and 8*e*, and totalizes the load powers of the checked units (at the state before execution of the switching control shown in FIG. 9, they are the load powers b, d and e [W], as shown in FIG. 9) among the load powers a, b, c, d and e [W] (a step 307).

The master unit 8*a* compares the total power T1 [W] with the maximum possibly supplied power Amax [W] (a step 308).

When the total power T1 [W] is not larger than the maximum possibly supplied power Amax [W] but substantially equal thereto at this stage, the control is completed.

In this case, the maximum possibly supplied power Amax [W] of the power generator is substantially equal to the total power T1 [W] of the load powers b, d and e [W]supplied to the power load groups 24*b*, 24*d* and 24*e*, so that almost all the rated output of the power generator can be consumed by the power load groups 24*b*, 24*d* and 24*e*, and the engine 4 can economically drive with its minimized fuel consumption per output.

From the viewpoint of efficiency in operation of the electric power system 1, the generated power being substantially equal to the maximum possibly supplied power Amax [W] is preferably up to about 95% of the maximum possibly supplied power Amax [W].

On the other hand, if the total power T1 [W] is smaller or larger than the maximum possibly supplied power Amax [W] at this stage, a step of equalizing the total power to the level substantially equal to the maximum power is executed.

Among the load powers a, b, c, d and e [W] (shown in FIG. 9) calculated at the step 305, the master unit 8*a* picks up a combination of ones whose total power T2 [W] becomes substantially equal to the maximum possibly supplied power Amax [W] (a step 309).

If any of the master unit 8*a* and the slave units 8*b*, 8*c*, 8*d* and 8*e*, which selects the commercial power source 40 as the power source, belongs to the unit group corresponding to the picked-up combination of powers, it is switched by command of the master unit 8*a* so as to select the generator power source. On the other hand, the master unit 8*a* keeps the switching position of any power source switching unit selecting the generator power source as the power source, if the unit belongs to the unit group corresponding to the picked-up combination of powers. In this way, the master unit commands shifting/maintaining of the power source selection over itself and the slave units 8*b*, 8*c*, 8*d* and 8*e* (a step 310).

By the command, each of the master unit 8*a* and the slave units 8*b*, 8*c*, 8*d* and 8*e* shifts or maintains its selection of the power source (a step 311). Thus, as shown in FIG. 9, the power source selection state 200 before executing the control is switched into the state 201 after executing.

As a result, the maximum possibly supplied power Amax [W] becomes substantially equal to the total power T2 [W] (a step 312), so that the power generator 3 is driven to generate nearly the rated output. Namely, in the state 201 shown in FIG. 9, the maximum possibly supplied power Amax [W] of the power generator is substantially equal to the total power T2 [W] of load powers supplied to the power load groups 24*a*, 24*d* and 24*e*, so that the power generator can have almost all its rated output consumed by the power load groups 24*a*, 24*c* and 24*e*, and the engine 4 can economically drive with its minimized fuel consumption per output.

Namely, each of the power source switching units 8 comprises means for recognize the power source selection state and the power value supplied to the corresponding power load group with respect to each of itself and the other power source switching units, and means for controlling the total power supplied by the electric power system substantially equal to the rated value, thereby having the ability of serving as the master unit. In more detail, the controlling means comprises the switching controller 9.

Based on time setting, the switching control is done at each predetermined period. The predetermined period may be given as an invariable, or alternatively established by inputting of the supervisory control unit 5 or the power source selector 6. The switching control is also performed when the generated power A [W] calculated by the supervisory control unit 5 is larger than the maximum possibly supplied power Amax [W] (steps 313 and 314).

[1-2: Switching Control by Self-Judgment of the Power Source Switching Units]

By the present control, each of the power source switching units 8*a*, 8*b*, 8*c*, 8*d* and 8*e* calculate its power source selection state and its load power a, b, c, d or e [W] supplied to the corresponding power load group 24*a*, 24*b*, 24*c*, 24*d* or 24*e*, compares its calculated load power with surplus power A1 [W] of the power generator 3, and selects shifting/maintaining of the power source for itself.

The present control, whose routine is included as a subroutine 400 in the flow chart 300 shown in FIG. 10, or performed as a control block independently of the flow chart 300, uses the generator output of the power generator 3 fully but without overload.

Figure 11:
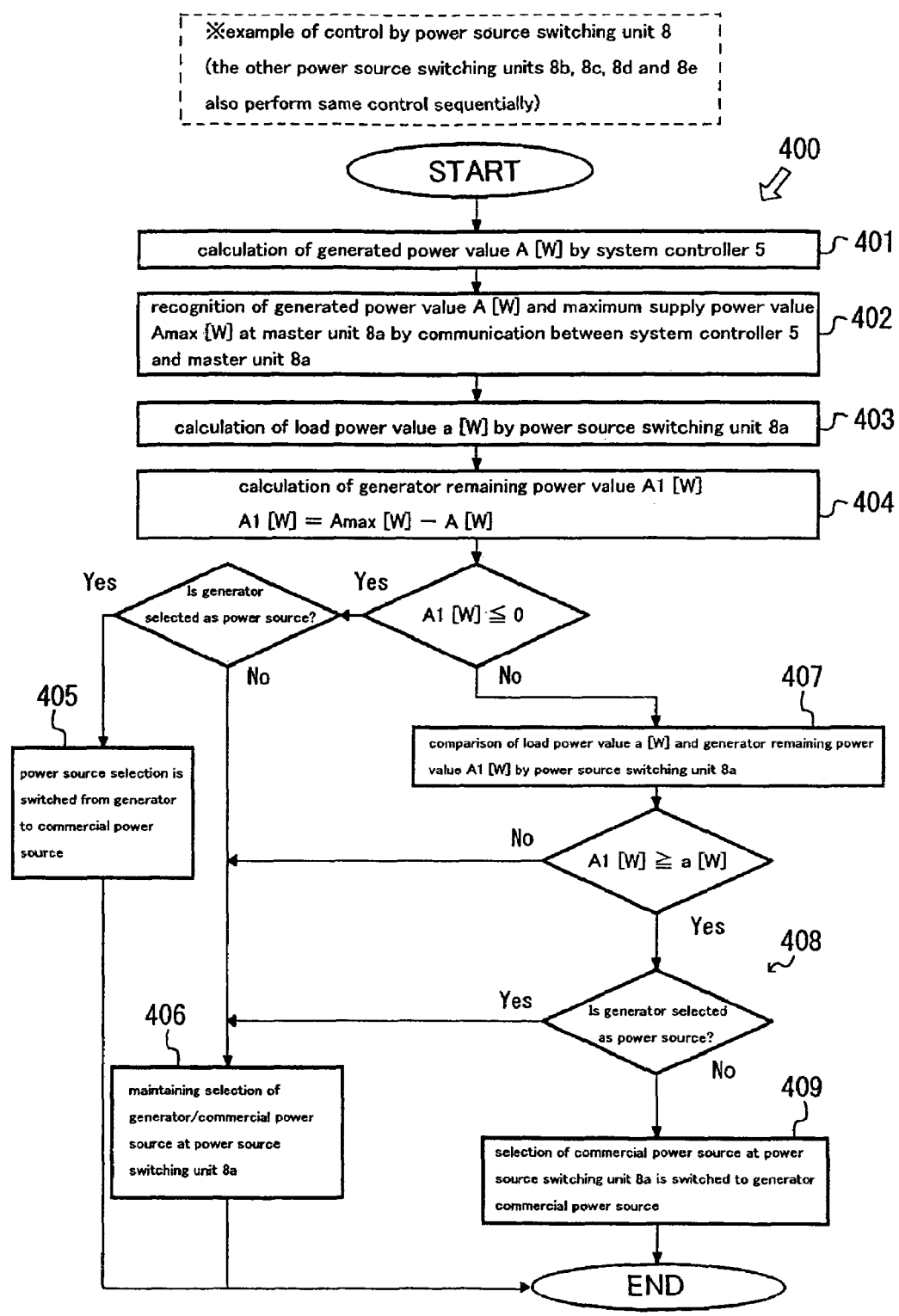
FIG. 11 is a flow chart of switching control of the power source switching unit by its self-judgment.

The present control is represented by a flow chart 400 of FIG. 11. Explanation will now be given of the flow chart 400.

Based on detection of the current and voltage by the detector (not shown) disposed in the output part of the power generator 3, the supervisory control unit 5 calculates generated power A [W] (a step 401).

The supervisory control unit 5 transmits its calculated data of the generated power A [W] to the power source switching unit 8*a* so that the power source switching unit 8*a* recognizes the generated power A [W] and the maximum possibly supplied power Amax [W] (a step 402).

Next, the power source switching unit 8*a* calculates its supplied load power a [W]. The power source switching unit 8*a* also calculates its generator/commercial power source selection state (a step 403).

The three steps 401, 402 and 403 are identical with the steps 301, 302, 303 and 304 in the flow chart 300 in FIG. 10. Accordingly, when the present control is included as a subroutine in the flow chart 300, the steps 401, 402 and 403 are omitted.

Next, based on the generated power A [W] and the maximum possibly supplied power Amax [W], the power source switching unit 8*a* calculates generator surplus power A1 [W] (a step 404). When the generator surplus power A1 [W] is smaller than zero at the step, it means that the power generator 3 is overloaded, whereby the power source switching unit 8 selecting the generator power source is switched to select the commercial power source 40 (a step 405) so as to prevent the power generator 3 from being overloaded. In the present embodiment (at the state before executing the switching control in FIG. 9), the power source switching unit 8*a* which has selected the commercial power source 40 maintains its selection (a step 406).

When the generator surplus power A1 [W] is larger than zero, the power source switching unit 8*a* compares its supplied load power a [W] with the generator surplus power A1 [W] (a step 407). If the supply load power a [W] is larger than the generator surplus power A1 [W], either the selected generator or commercial power supply 40 is maintained as the selected power source, and the present control is completed. On the other hand, if the supply load power a [W] is smaller than the generator surplus power A1 [W], a judgment step of selection of the power source is performed. Namely, the power source switching unit 8*a* judges whether the commercial power supply 40 or the generator power source is selected as its power source (a step 408).

If the power source switching unit 8*a* selects the generator power source, the selection is maintained and the present control is completed. On the other hand, when the power source switching unit 8*a* selects the commercial power supply 40, the power source switching unit 8*a* is switched to shift its selected power source from the commercial power supply 40 to the generator power source (a step 409).

The switching control is relayed among the power source switching units 8*a*, 8*b*, 8*c*, 8*d* one after another, so that each of the units compares its load power a, b, c, d or e [W] with the generator surplus power A1 [W] and judges keeping/shifting of its power source selection. Consequently, the power source selection state 200 before executing the control is switched to the state 201 after executing as shown in FIG. 9.

As a result, the output of the power generator 3 is fully used while being prevented from overload driving.

Namely, each power source switching unit has means for controlling the switching of the power source based on information of the rated output or the maximum output of the power generation system 2. In more detail, the controlling means comprises the switching controller 9.

The preset value stored in the power generation system 2 is not limited to the above-mentioned rated output or maximum output. It is appreciated that a suitable preset value corresponding to usage of the power generation system 2 may be stored in the power generation system 2 for the switching control of the power source based on the preset value.

[2: Power Control Function]

Next, explanation will be given on power control function of the electric power system 1 with the above-mentioned construction.

The power control function comprises function such that the supervisory control unit 5 or each of the power source switching units 8*a*, 8*b*, 8*c*, 8*d* and 8*e* itself (the power source selector 6) calculates electric energy [Wh] of each of the power source switching units 8*a*, 8*b*, 8*c*, 8*d* and 8*e* supplied from the selected power source, i.e., either the generator power source or the commercial power supply 40, to the corresponding power load group 24 (shown in FIG. 8) based on the history of the corresponding power source selection of the power source, and displays the calculated result on its or other's displaying device. The power control function further comprises function such that each of the power source switching units 8*a*, 8*b*, 8*c*, 8*d* and 8*e* controls the generator power supply and its switching for power source selection based on established control parameters including the rated or maximum output of the generator power supply and the timing of its switching for power source selection, which are optionally established by a user.

[2-1: Calculation and Display of Itemized Supplied Electric Energy Including Generated Electric Energy]

Figure 12:
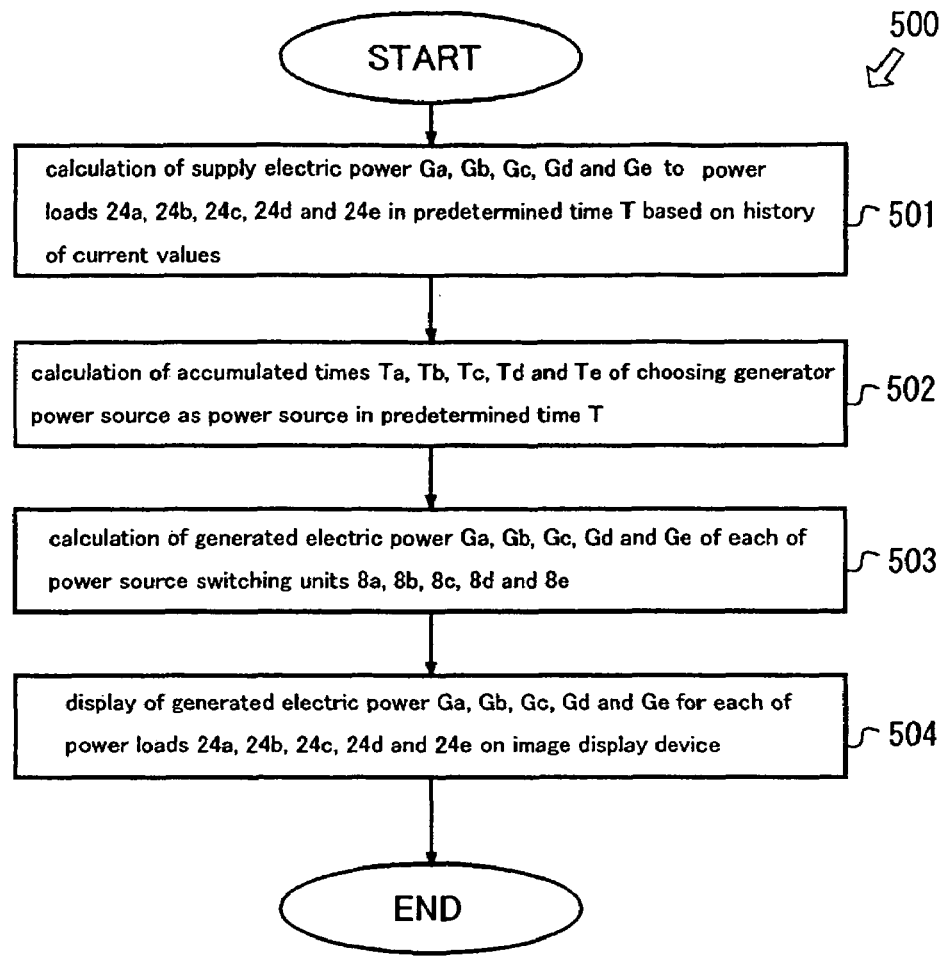
FIG. 12 is a flow chart including steps of calculation and display of generated electric energy share in supplied electric energy.

A flow chart 500 of FIG. 12 represents steps for calculating generated electric energy [Wh] in supply electric energy [Wh], which is itemized by the power source switching units.

Firstly, in the power source switching units 8a, 8b, 8c, 8d and 8e, the switching controllers 9a, 9b, 9c, 9d and 9e (shown in FIG. 8, partly omitted) calculate their supplied electric energies Ca, Cb, Cc, Cd and Ce to the corresponding loads 24a, 24b, . . . at each predetermined time T based on data history of electric current, respectively (a step 501).

In the power source switching units 8a, 8b, 8c, 8d and 8e, the switching controllers 9a, 9b, 9c, 9d and 9e calculate accumulated times Ta, Tb, Tc, Td and Te of selecting the generator power source as their power source at each predetermined time T, respectively (a step 502).

In each of the power source switching units 8a, 8b, 8c, 8d and 8e, each of the switching controllers 9a, 9b, 9c, 9d and 9e multiplies its supplied electric energy Ca, Cb, Cc, Cd or Ce by the corresponding accumulated time Ta, Tb, Tc, Td or Te, and divides its multiplied result by the predetermined time T, thereby calculating its supplied generated electric energy Ga, Gb, Gc, Gd or Ge (a step 503).

The switching controllers 9a, 9b, 9c, 9d and 9e transmit the data of their respective calculated supplied generated electric energies Ga, Gb, Gc, Gd and Ge to the supervisory control unit 5. The supervisory control unit 5 makes the display 32 of the operation-and-display unit 28 display the supplied generated electric energies Ga, Gb, Gc, Gd and Ge in association with the respective power load groups 24a, 24b, 24c, 24d and 24e (a step 504).

Figure 8:
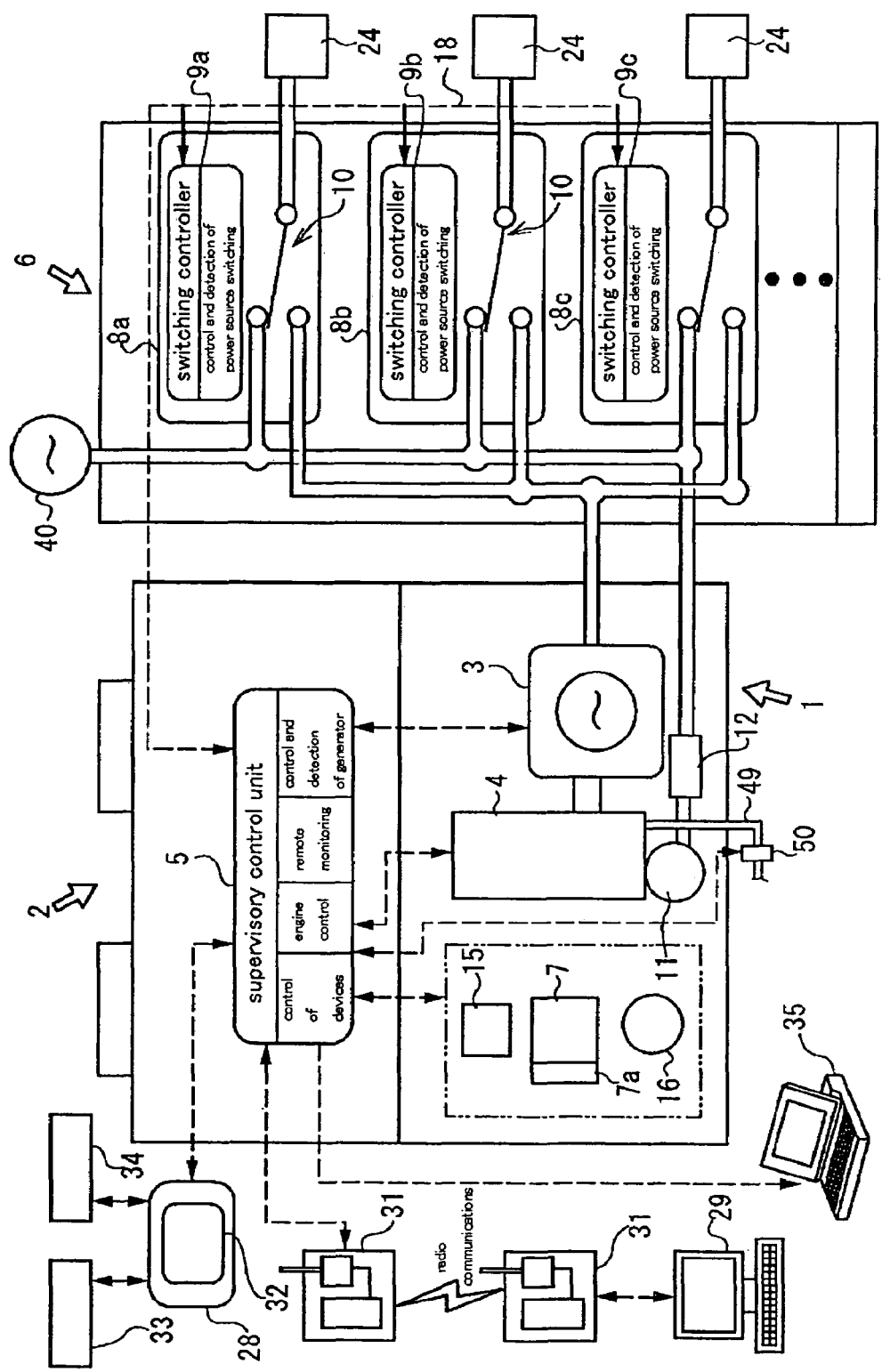
FIG. 8 is a schematic diagram of an electric power system according to a second embodiment of the present invention.

The data may be displayed by the construction shown in FIG. 8, or alternatively by the operation-and-display unit 28 directly networked with the power source selector 6. Alternatively, the power source selector 6 may comprise an operation-and-display device, to which each of the power source switching units 8a, 8b, 8c, 8d and 8e can directly transmit its supplied generated electric energy Ga, Gb, Gc, Gd or Ge calculated by the corresponding switching controller 9a, 9b, 9c, 9d or 9e, such as to display the supplied generated electric energies Ga, Gb, Gc, Gd and Ge without through the supervisory control unit 5.

Figure 13:
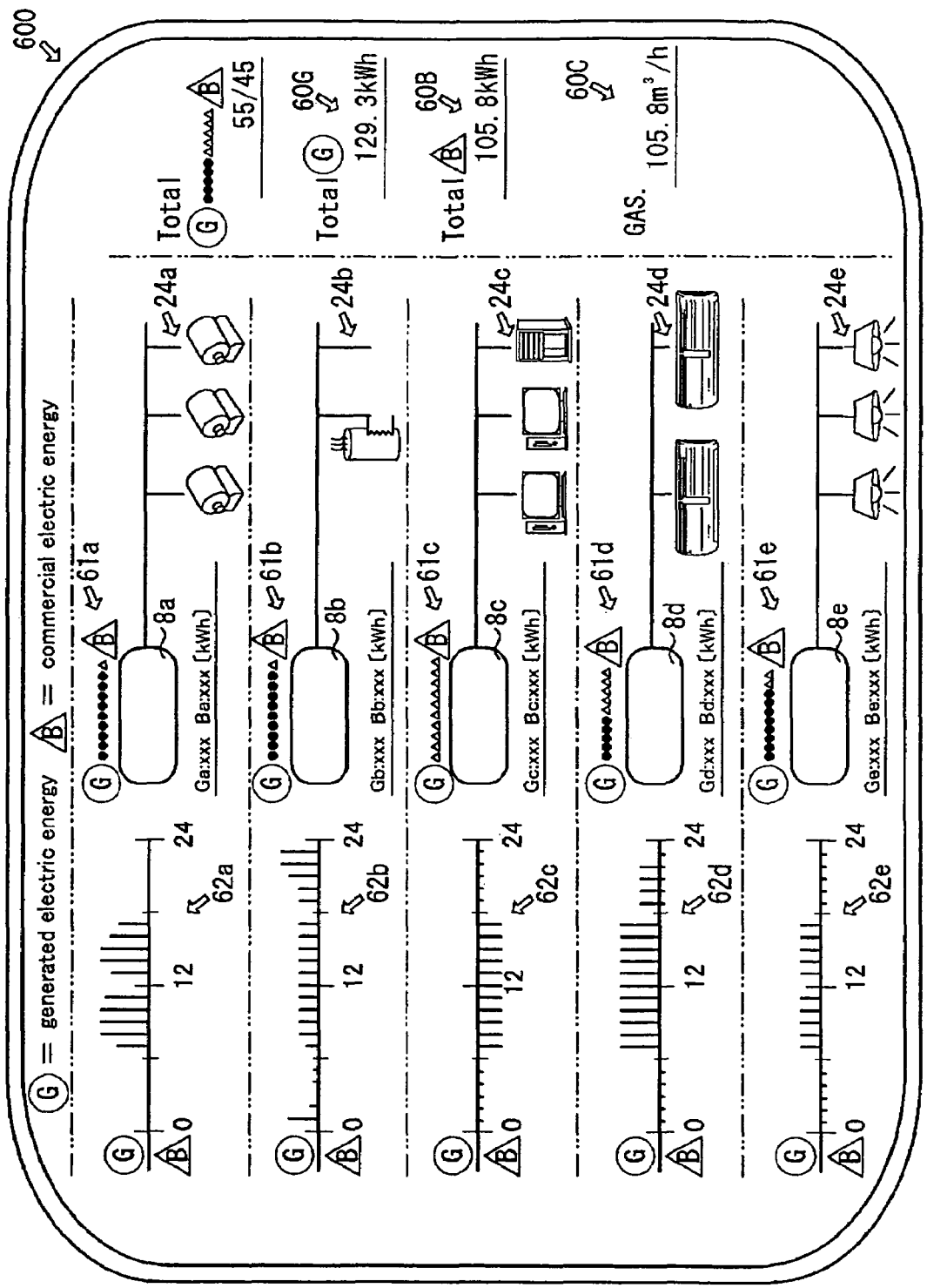
FIG. 13 is a drawing as an example of an image displayed by the steps in FIG. 5.

FIG. 13 shows an example of the displayed image.

A display screen 600 numerically displays the supplied generated electric energies Ga, Gb, Gc, Gd and Ge and supplied commercial electric energies Ba, Bb, Bc, Bd and Be (each of which is the remainder of the supplied electric energy C minus G) in the respective areas of the power source switching units 8a, 8b, 8c, 8d and 8e, that is, of the power load groups 24a, 24b, 24c, 24d and 24e. Respective total energies 60G and 60B are also displayed.

In the areas of the respective power source switching units 8a, 8b, 8c, 8d and 8e, that is, of the respective power load groups 24a, 24b, 24c, 24d and 24e, respective meters 61a, 61b, 61c, 61d and 61e and respective time charts 62a, 62b, 62c, 62d and 62e are indicated, wherein each of the meters represents the relation between the corresponding supplied generated power and commercial electric power, and each of the time charts represents electric energy of the selected power source (the supplied generated electric energy G or the supplied commercial electric energy B) periodically.

Accordingly, a breakdown of the generated electric power [Wh] and the commercial electric power [Wh] (a ratio therebetween, electric energy and time zone thereof) is displayed in correspondence to each of the power load groups 24a, 24b, 24c, 24d and 24e.

Fuel consumption 60C calculated based on detection by the fuel flowmeter 50 is also displayed so as to facilitate for check of fuel consumption for generating power.

[2-2: Drive Control by Parameter Setting]

Figure 14:
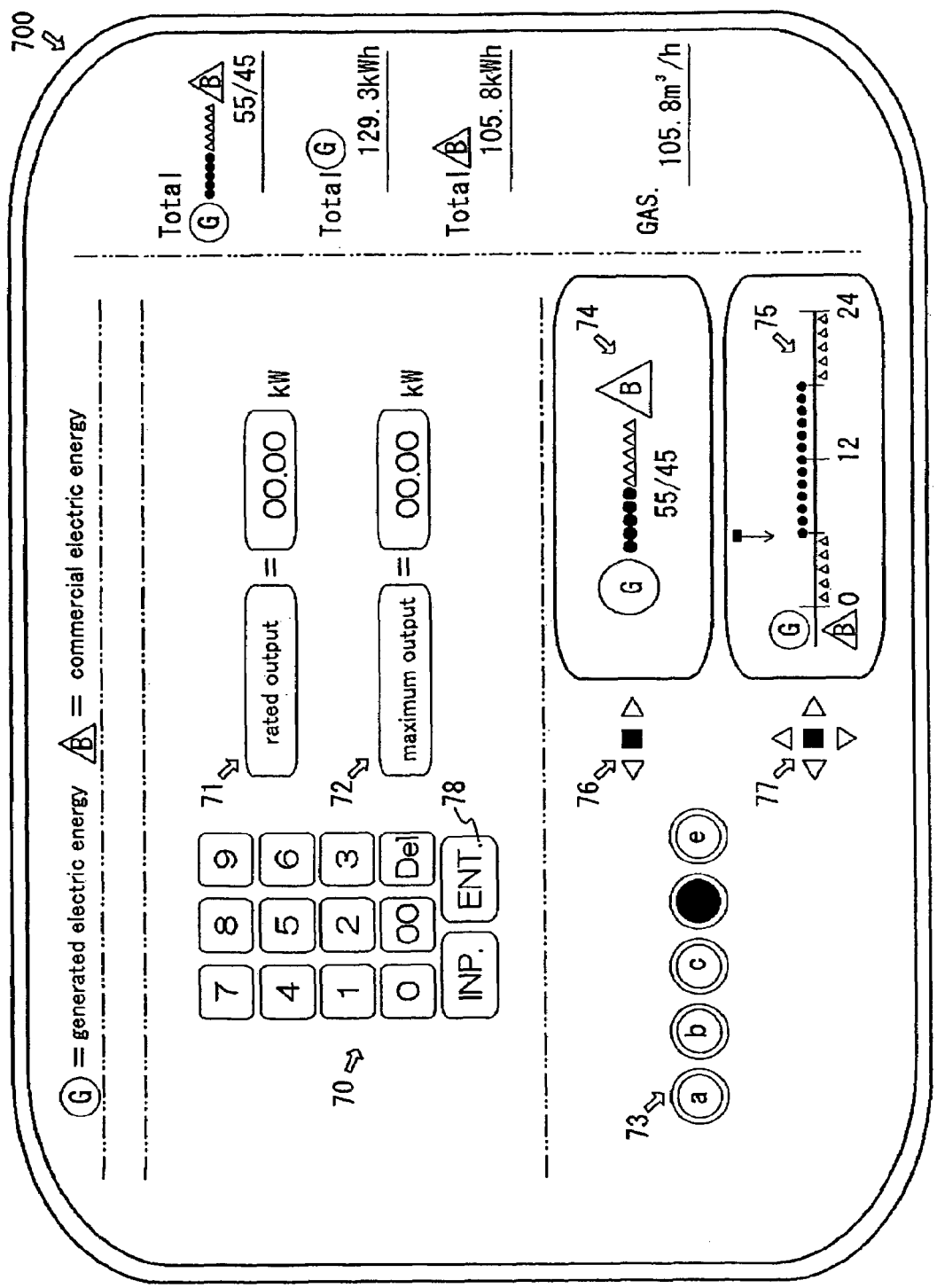
FIG. 14 is a drawing as an example of an entry screen for setting various parameters.

FIG. 14 shows an example of an entry screen 700 displayed on the display 32 of the operation-and-display unit 28 used for setting parameters. The example of the entry screen 700 is that of a so-called touch panel.

Rated output 71 and the maximum output 72 of the generator power source can be inputted numerically into the entry screen 700 through a numerical input means 70.

One of the power source switching units 8a, 8b, 8c, 8d and 8e is selected for the setting by a power source switching unit selection means 73, so that its setting of a used rate of generated power use rate 74 (the same graph as the above-mentioned meter) and setting of power source selection switching timing 75 (the same graph as the above-mentioned time chart) are indicated, and the settings can be changed by operation of respective buttons 76 and 77.

Figure 15:
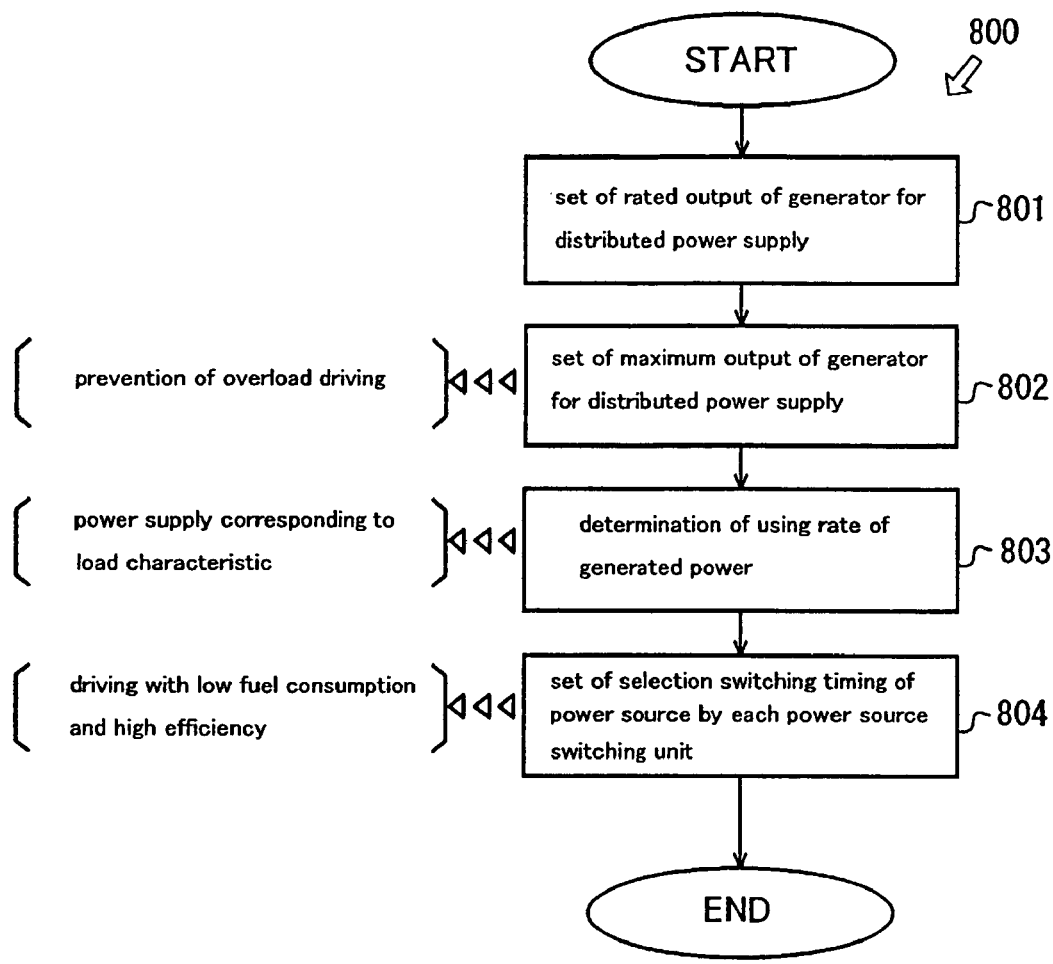
FIG. 15 is a flow chart including steps of parameter setting and representing effects thereof.

An execution button 78 is also displayed, which is touched for updating the parameter setting in the supervisory control unit 5 after the above-mentioned entry of settings Explanation will be given on the above-mentioned setting and effects thereof according to a flow chart 800 shown in FIG. 15.

Firstly, at a setting stage of rated output of the generator power source (a step 801), an initial value of rated output can be inputted to be established.

At a setting stage of maximum output of the generator power source (a step 802), maximum output of the generator power source can be set. According to the setting, the engine 4 is not operated so as to make its output larger than the predetermined output, thereby preventing overload driving of the engine 4.

At a setting stage of used rate of the generator power source (a step 803), a used rate of the generator power source in the supplied power can be set compulsorily. Accordingly, for example, such a power control pattern is possible that control devices including a computer is constantly supplied with only the commercial power by zeroing the rate of the generated power, and devices such as a machining motor which do not require so high quality of electricity are supplied with the generated power by setting the rate of generated power to 100%.

Selection switching timing of the power source can be set compulsorily at a setting stage of the selection switching timing of the power source (a step 804). Such a time setting is advantageous in night power control, for instance, such that the engine 4 is shut down so as to supply only the cheep nighttime power from the external power source, or in prevention of the low-output driving of the engine 4 causing low fuel efficiency in such a case where the night power demand of the power load groups 24a, 24b, 24c, 24d and 24e is few.

In the present construction, the operation-and-display unit 28 is used for optional setting including the setting for saving fuel or for prevention of overload driving of the engine, the setting of used rate of generated power, and the setting concerning selection of the power source.

Though the commercial power source 40 serves as the external power source in the above-mentioned embodiment, any power source other than the commercial power source 40 may serve as the external power source if it supplies power from the outside of the electric power system.

INDUSTRIAL APPLICABILITY

An electric power system according to the present invention comprising a generator driven by an engine and power source switching units corresponding to respective power load groups, wherein each of the power source switching units controls its switching for selecting whether the generator or an external power source supplies power to the corresponding power load group, is useful in ability of detecting the selected power source, and detecting current and voltage of (load) power from the selected power source. Therefore, it is convenient for constructing an inexpensive power management system and in miniaturizing the whole system.

The invention claimed is:

1. An electric power source management system for an electric power system, the electric power system comprising:
    an external power source; and
    a power generation system comprising an engine, a generator driven by the engine, and a plurality of power source switching units networked with each other so as to constitute the electric power source management system, wherein each of the power source switching units selects a power source and comprises:
    means for periodically detecting information about each selected power source and its power supplied from the selected power source,
    means for calculating electric energy supplied from each selected power source based on data detected by the detecting means, and
    means for storing the detected data and data calculated by the calculating means.

2. The electric power source management system as set forth in claim 1, wherein electric power loads are classified into a plurality of power load groups, each of which is provided with each of the power source switching units.

3. The electric power source management system as set forth in claim 1, further comprising:
    means for transmitting the detected data or the calculated data of each of the power source switching units to a control system of the power generation system.

4. The electric power source management system as set forth in claim 3, wherein the control system of the power generation system comprises:
    means for receiving data transmitted from the power source management system; and
    image-displaying means for displaying the received data diagrammatically.

5. The electric power source management system as set forth in claim 4, wherein the image-displaying means has a single screen displaying the periodically detected data and calculated data of the respective power source switching units together.

6. The electric power source management system as set forth in claim 2, wherein each of the power source switching units is configured to serve as a master unit, the master unit comprising:
    means for recognizing the selection of the power source and the supplied power to a corresponding power load group connected to the power source switching unit itself or each of the other power source switching units; and
    means for controlling a total value of power supplied of the electric power system to a level substantially equal to a rated value.

7. The electric power source management system as set forth in claim 1, wherein each of the power source switching units further comprises:
    means for controlling the switching of power sources-to-be-selected based on information concerning a predetermined output value of the power generation system.

8. The electric power source management system as set forth in claim 2, further comprising:
    means for transmitting the detected data or the calculated data of each of the power source switching units to a control system of the power generation system.

9. The electric power source management system as set forth in claim 8, wherein the control system of the power generation system comprises:
    means for receiving a data transmitted from the power source management system; and
    image-displaying means for displaying the received data diagrammatically.

10. The electric power source management system as set forth in claim 2, wherein each of the power source switching units comprises:
    means for controlling its switching for selecting the power source based on information concerning a predetermined output value of the power generation system.

11. A method of managing an electric power source using an electric power system comprising: (i) an external power source; and (ii) a power generation system comprising an engine, a generator driven by the engine, and a plurality of power source switching units networked with each other, said method comprising:
    selecting a power source by each power source switching unit;
    periodically detecting information about each selected power source and its power supplied from each selected power source,
    calculating electric energy supplied from each selected power source based on the detected information, and
    storing the detected information and the calculated energy.

* * * * *